United States Patent
Mashimo

(10) Patent No.: US 6,680,892 B2
(45) Date of Patent: Jan. 20, 2004

(54) OPTICAL DISK DEVICE OFFSETTING A WOBBLE SIGNAL COMPONENT SUPERIMPOSED ON AN RF SIGNAL AND THE WOBBLE SIGNAL COMPONENT ADDED IN A THRESHOLD VALUE UPON MAKING THE RF SIGNAL BINARY

(75) Inventor: Akira Mashimo, Tokorozawa (JP)

(73) Assignee: Teac Corporation, Tokyo (JP)

(*) Notice: Subject to any disclaimer, the term of this patent is extended or adjusted under 35 U.S.C. 154(b) by 219 days.

(21) Appl. No.: 09/994,715

(22) Filed: Nov. 28, 2001

(65) Prior Publication Data

US 2002/0085472 A1 Jul. 4, 2002

(30) Foreign Application Priority Data

Dec. 5, 2000 (JP) .................................... 2000-370071

(51) Int. Cl.[7] .................................................. G11B 7/00
(52) U.S. Cl. .................. 369/59.17; 369/44.13; 369/44.25; 369/124.15
(58) Field of Search .................. 369/44.25, 44.13, 369/44.34, 44.41, 47.1, 53.1, 59.1, 59.17, 124.01, 124.15

(56) References Cited

U.S. PATENT DOCUMENTS

| 4,860,271 A | * | 8/1989 | Yokogawa et al. | ........ | 369/44.13 |
| 6,101,163 A | * | 8/2000 | Kanno et al. | ............ | 369/124.1 |

FOREIGN PATENT DOCUMENTS

JP  2000-155942  6/2000

* cited by examiner

Primary Examiner—Muhammad Edun
(74) Attorney, Agent, or Firm—Anderson Kill & Olick; Eugene Lieberstein; Michael N. Meuer

(57) ABSTRACT

An optical disk device reproduces an RF signal by projecting a light beam on an optical disk and detecting a reflected light therefrom. On the optical disk, information is recorded by forming a pit on a track determined according to a groove having a wobble signal recorded thereon. The optical disk device comprises a comparator comparing the RF signal with a threshold value so as to output a binary signal, a first band-pass filter filtering a frequency band of the wobble signal from the binary signal so as to extract a wobble signal component, and a first adder obtaining a value by adding the wobble signal component to a fixed reference value so as to supply the value to the comparator as the threshold value.

5 Claims, 14 Drawing Sheets

OPTICAL DISK DEVICE OFFSETTING A WOBBLE SIGNAL COMPONENT SUPERIMPOSED ON AN RF SIGNAL AND THE WOBBLE SIGNAL COMPONENT ADDED IN A THRESHOLD VALUE UPON MAKING THE RF SIGNAL BINARY

BACKGROUND OF THE INVENTION

1. Field of the Invention

The present invention generally relates to an optical disk device and, more particularly, to an optical disk device reproducing information from an optical disk or recording and reproducing information to/from an optical disk.

2. Description of the Related Art

A write-once optical disk, such as a CD-R (Compact Disk-Recordable), and a DVD-R (Digital Versatile Disk-Recordable), and a rewritable optical disk, such as a CD-RW (CD-Rewritable), a DVD-RW (DVD-Rewritable), a DVD-RAM, and an MO (Magneto Optical disk), are provided with guiding grooves beforehand. In these optical disks, the grooves and lands (parts between the grooves) are determined as tracks. A light beam is projected along these tracks so as to form pits on the tracks; thereby, information is recorded. In this course, a tracking servo used for projecting the light beam along the tracks is controlled such that the center of an optical axis of the light beam coincides with the centerline of the track.

The grooves wobble slightly in a radial direction at a center frequency of 22.05 kHz. Address information (i.e., time information) upon recording, referred to as ATIP (Absolute Time In Pregroove), is multiplexed by an FSK modulation with the maximum excursion of ±1 kHz, and is recorded on the grooves as a wobble signal. This wobble signal has a micro amplitude, and thus, does not interfere with the tracking servo. Additionally, the frequency of the wobble signal is out of a control frequency band of the tracking servo; therefore, the center of the optical axis of the light beam traces the centerline of the track on average.

Accordingly, in an optical disk device, an optical detector, which has a light-receiving surface divided into two in the radial direction of the optical disk, receives the light beam reflected on the optical disk. Then, photoelectric conversion signals of this light-receiving surface divided in two are subjected to a differential amplification so that the wobble signal is detected. Then, a spindle motor is revolved, based on a carrier-wave signal at a frequency of 22.05 kHz of the wobble signal so as to revolve the optical disk at a predetermined revolving velocity. Further, the wobble signal is demodulated so as to detect the address information.

On the other hand, upon reproducing, the light beam is projected on the pits formed on the tracks, while being controlled such that the center of the optical axis of the light beam coincides with the centerline of the track. Then, the optical detector, which has the light-receiving surface divided into two in the radial direction of the optical disk, receives the light beam reflected on the optical disk. Then, photoelectric conversion signals of this light-receiving surface divided in two are added so that a recorded signal is detected. This addition offsets the wobble signal component.

FIG. 1 is a block diagram of an example of a signal reproduction circuit of a conventional optical disk device. In FIG. 1, a terminal 10 is supplied with a reproduction RF signal obtained by projecting a light beam from a laser diode of an optical pickup to the optical disk revolved at a predetermined revolving velocity, detecting the reflected light by the optical detector of the optical pickup, and adding the photoelectric conversion signals of the light-receiving surface divided in two. Direct-current components of the reproduction RF signal are removed in a capacitor 11 functioning as a high-pass filter, and the reproduction RF signal is supplied to a noninverting input terminal of a comparator 12. A fixed reference value is supplied from a reference voltage source 13 to an inverting input terminal of the comparator 12. The comparator 12 compares the RF signal with the reference value so as to make the RF signal binary. This binary signal is supplied to a PLL (Phase Locked Loop)/detector 16.

The PLL/detector 16 generates, in a PLL thereof, a clock PCLK synchronized with the supplied binary signal, and outputs the clock PCLK via a terminal 18. Also, the PLL/detector 16 detects, in a detector thereof, the presence of a reproduction pulse by a detecting window determined based on the clock PCLK so as to discriminately reproduce a signal REFM and output the signal REFM via a terminal 19.

FIG. 2 is a block diagram of another example of a signal reproduction circuit of a conventional optical disk device. In FIG. 2, the terminal 10 is supplied with the reproduction RF signal obtained by projecting the light beam from the laser diode of the optical pickup to the optical disk revolved at a predetermined revolving velocity, detecting the reflected light by the optical detector of the optical pickup, and adding the photoelectric conversion signals of the light-receiving surface divided in two. The direct-current components of the reproduction RF signal are removed in the capacitor 11 functioning as a high-pass filter, and the reproduction RF signal is supplied to the noninverting input terminal of the comparator 12. A threshold value corresponding to a midpoint potential of the RF signal is supplied from a low-pass filter/amplifier (LPF/AMP) 14 to the inverting input terminal of the comparator 12. The comparator 12 compares the RF signal with the threshold value so as to make the RF signal binary. This binary signal is supplied to the low-pass filter/amplifier 14 and the PLL/detector 16.

The low-pass filter/amplifier 14 integrates the binary signal, and thereafter, amplifies the integrated value with a predetermined gain so as to generate the threshold value corresponding to the midpoint potential of the RF signal. Then, the low-pass filter/amplifier 14 supplies the threshold value to the comparator 12. The comparator 12 and the low-pass filter/amplifier 14 form an asymmetry correction circuit, which determines the threshold value such that high-level periods and low-level periods of the binary signal become equal in total. A response characteristic of this asymmetry correction circuit is optimized by adjusting a time constant and a gain of the low-pass filter/amplifier 14, an amplitude of the RF signal, and an output voltage of the comparator 12.

The PLL/detector 16 generates, in the PLL thereof, the clock PCLK synchronized with the supplied binary signal, and outputs the clock PCLK via the terminal 18. Also, the PLL/detector 16 detects, in the detector thereof, the presence of a reproduction pulse by the detecting window determined based on the clock PCLK so as to discriminately reproduce the signal REFM and output the signal REFM via the terminal 19.

By the way, the light beam projected from the laser diode has different powers as a write power and a read power; therefore, the optical axis may possibly be displaced. In FIG. 3, the light beam as the read power is projected from the laser diode as indicated by solid lines, and the light beam as the write power is projected from the laser diode as indicated by broken lines. Therein, the optical axis is displaced by an angle θ. When the optical axis is displaced in a widthwise direction of the groove, pits recorded by the write power are displaced from the centerline of the track, as shown in FIG. 4, because, even upon recording, a tracking error signal is generated at a read-power timing. Additionally, there are other cases in which, for example, the pits are displaced from the centerline of the track, due to remaining heat of the adjacent track after the completion of a recording.

When the groove is used as a track, and the light beam is projected, with the optical axis thereof being displaced from the centerline of the groove, the light beam comes near to the centerline of the groove or goes far away from the centerline of the groove, depending on a wobbling cycle, because the groove wobbles as described above. When the light beam is projected near the centerline of the groove, the recording becomes normal. However, when the light beam is projected far away from the centerline of the groove, the recording becomes insufficient by being influenced by an end portion of the groove. Thus, the pits are influenced by the wobbling cycle.

Upon reproducing, a tracking error signal is generated from the pits and the groove such that the light beam substantially passes through the vicinity of the center of the pit. However, an amplitude fluctuation or a waveform distortion of the wobbling frequency occurs in the reproduction RF signal, due to the influence made upon the recording. This influence becomes greater as the cycle of the recorded signal becomes shorter; in a CD, a signal of 3T (a reference time period T is approximately 230 nsec, i.e., one cycle of a frequency of 4.32 MHz at a normal speed, i.e., a single-fold speed) is influenced the most. FIG. 5 shows the reproduction RF signal in this case.

If an envelope of the RF signal supplied to the comparator 12 shown in FIG. 1 fluctuates up and down due to the wobble signal component, a reproduction jitter occurs, when the comparator 12 makes the RF signal binary; this causes a problem that the binary signal output by the comparator 12 includes the wobble signal component.

In the asymmetry correction circuit of the conventional signal reproduction circuit shown in FIG. 2, since the RF signal is made binary exactly in accordance with a scratch, a spot, and unsteady reflectance on the surface of the optical disk, a response time constant is set sufficiently high so as not to interfere with an EFM frequency component. However, since a frequency band of the wobble signal component partially overlaps a frequency band of the EFM frequency component, the wobble signal component is not extracted in the low-pass filter/amplifier 14. Therefore, the asymmetry correction circuit responds to the above-mentioned wobble signal component included in the RF signal supplied to the comparator 12, and the threshold value supplied to the comparator 12 fluctuates in response to the wobble signal component. The reproduction jitter deteriorates due to this fluctuation of the threshold value.

SUMMARY OF THE INVENTION

It is a general object of the present invention to provide an improved and useful optical disk device in which the above-mentioned problems are eliminated.

A more specific object of the present invention is to provide an optical disk device which can reduce a reproduction jitter resulting from a wobble signal component superimposed on a reproduction RF signal.

In order to achieve the above-mentioned objects, there is provided according to one aspect of the present invention an optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing the RF signal with a threshold value so as to output a binary signal;

a first band-pass filter filtering a frequency band of the wobble signal from the binary signal so as to extract a wobble signal component; and a first adder obtaining a value by adding the wobble signal component to a fixed reference value so as to supply the value to the comparator as the threshold value.

According to the present invention, the wobble signal component superimposed on the RF signal and the wobble signal component of the threshold value are offset so as to reduce the generation of a reproduction jitter upon making the RF signal binary.

In order to achieve the above-mentioned objects, there is also provided according to another aspect of the present invention an optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing the RF signal with a threshold value so as to output a binary signal;

a second band-pass filter filtering a frequency band of the wobble signal from the RF signal so as to extract a wobble signal component; and a second adder obtaining a value by adding the wobble signal component to a fixed reference value so as to supply the value to the comparator as the threshold value.

According to the present invention, the wobble signal component superimposed on the RF signal and the wobble signal component of the threshold value are offset so as to reduce the generation of a reproduction jitter upon making the RF signal binary.

In order to achieve the above-mentioned objects, there is also provided according to another aspect of the present invention an optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing the RF signal with a threshold value so as to output a binary signal;

a first band-pass filter filtering a frequency band of the wobble signal from the binary signal so as to extract a wobble signal component;

an integrator integrating the binary signal so as to generate an integrated reference value; and a third adder obtaining a value by adding the wobble signal component to the integrated reference value so as to supply the value to the comparator as the threshold value.

According to the present invention, the wobble signal component superimposed on the RF signal and the wobble signal component of the threshold value are offset so as to reduce the generation of a reproduction jitter upon making the RF signal binary.

In order to achieve the above-mentioned objects, there is also provided according to another aspect of the present invention an optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing the RF signal with a threshold value so as to output a binary signal;

a second band-pass filter filtering a frequency band of the wobble signal from the RF signal so as to extract a wobble signal component;

an integrator integrating the binary signal so as to generate an integrated reference value; and a fourth adder obtaining a value by adding the wobble signal component to the integrated reference value so as to supply the value to the comparator as the threshold value.

According to the present invention, the wobble signal component superimposed on the RF signal and the wobble signal component of the threshold value are offset so as to reduce the generation of a reproduction jitter upon making the RF signal binary.

In order to achieve the above-mentioned objects, there is also provided according to another aspect of the present invention an optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing the RF signal with a threshold value so as to output a binary signal;

a first band-pass filter filtering a frequency band of the wobble signal from the binary signal so as to extract a wobble signal component;

an integrator integrating the binary signal so as to generate an integrated reference value and supply the integrated reference value to the comparator as the threshold value; and a subtracter subtracting the wobble signal component from the RF signal so as to supply the RF signal to the comparator.

According to the present invention, the wobble signal component superimposed on the RF signal is removed so as to reduce the generation of a reproduction jitter upon making the RF signal binary.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 6:
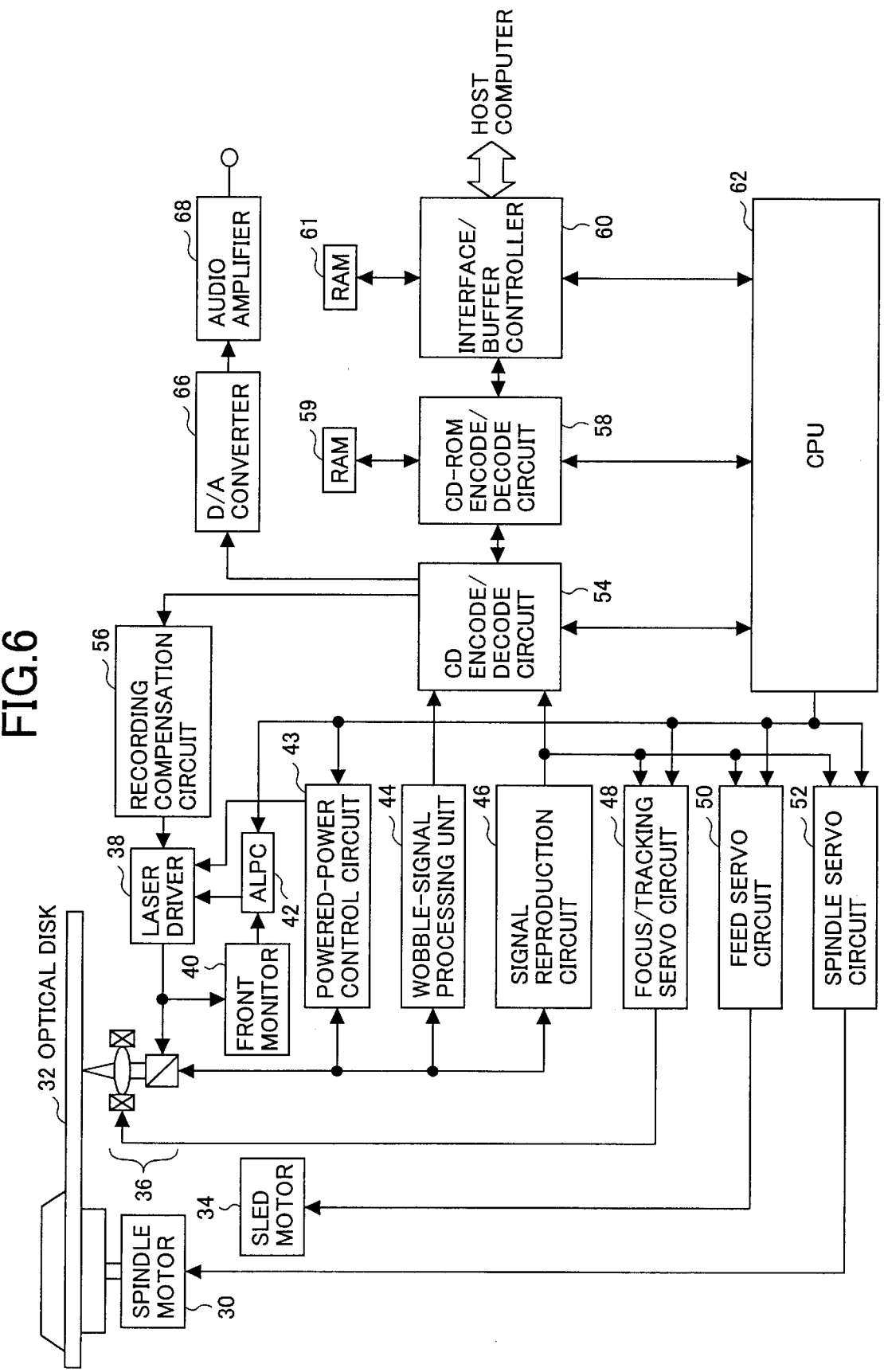
FIG. 6 is a block diagram of an optical disk device according to an embodiment of the present invention.

FIG. 6 is a block diagram of an optical disk device according to an embodiment of the present invention. In FIG. 6, a spindle motor 30 revolves an optical disk 32 at a predetermined revolving velocity. A sled motor 34 moves an optical pickup 36 in a radial direction of the optical disk. The optical pickup 36 comprises an optical objective lens, an actuator, a ¼ wave-plate, a collimator lens, a beam splitter, a light-emitting element (a laser diode), an optical detector, and other elements.

A laser driver 38 causes the laser diode to radiate and emit a laser beam. A front monitor 40 detects and outputs a light intensity of the light beam. An ALPC (Automatic Laser Power Control) 42 controls the laser driver 38 according to the output of the front monitor 40 such that the laser beam has an optimal power.

Based on a relation between a powered projective luminous energy calculated upon shipping and a driving voltage of the laser driver, a powered-power control circuit 43 calculates a powered projective luminous energy corresponding to a laser driver voltage so as to control a powered power superimposed on a record power of a recording laser power.

A wobble-signal processing unit 44 performs a demodulation of an ATIP signal. It is noted that an optical disk of a recording type is provided with guiding grooves. A signal reproduction circuit 46 amplifies and reproduces a reproduction signal. This signal reproduction circuit 46 includes a matrix amplifier, and extracts various servo signals as well as a main signal so as to supply the servo signals to each of the following servo circuits. A focus/tracking servo circuit 48 drives the actuator, and controls a focus servo and a tracking servo. A feed servo circuit 50 drives and controls the sled motor 34. A spindle servo circuit 52 drives and controls the spindle motor 30.

A CD encode/decode circuit 54 performs processes, such as an encode/decode of CIRC (Cross Interleaved Read-solomon Code), an EFM (Eight to Fourteen Modulation) and its demodulation, and a synchronism detection. A recording compensation circuit 56 performs a data correction to record data transmitted from the CD encode/decode circuit 54, the data correction corresponding to characteristics of media upon recording. The amount of the correction varies depending on characteristics of a recording layer, a profile of a recording laser beam, a linear velocity for performing a recording, etc.

A CD-ROM encode/decode circuit 58 performs processes, such as an encode/decode of ECC (Error Correct Code) typical of a CD-ROM, and a detection of a header. An interface/buffer controller-60 transmits and receives data to/from a host computer, and controls a data buffer. RAMs 59 and 61 are auxiliary memories storing data temporarily for performing a data processing.

A CPU 62 is a microcomputer conducting controls of a CD-R drive as a whole including mechanical operations. A D/A converter 66 converts audio data transmitted from the CD encode/decode circuit 54 to an analog audio signal. An audio amplifier 68 amplifies and outputs the analog audio signal.

Figure 7:
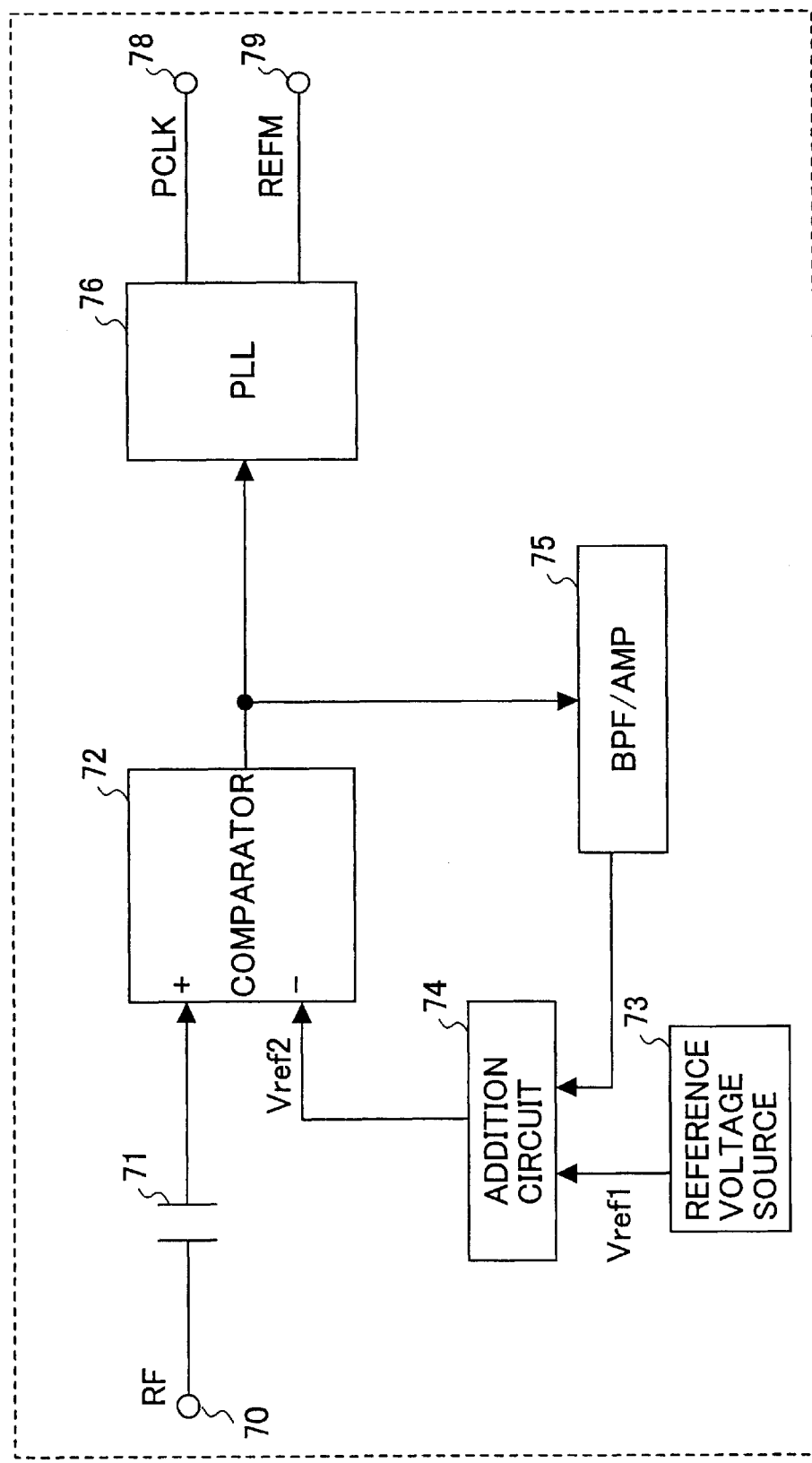
FIG. 7 is a block diagram of main parts of a signal reproduction circuit according to a first embodiment of the present invention.

FIG. 7 is a block diagram of main parts of the signal reproduction circuit 46 according to a first embodiment of the present invention. In FIG. 7, a terminal 70 is supplied with a reproduction RF signal obtained by projecting a light beam from the laser diode of the optical pickup 36 to the optical disk 32 revolved at a predetermined revolving velocity, detecting the reflected light by the optical detector of the optical pickup 36, and adding photoelectric conversion signals of a light-receiving surface of the optical detector, the light-receiving surface being divided in two. Direct-current components of the reproduction RF signal are removed in a capacitor 71 functioning as a high-pass filter, and the reproduction RF signal is supplied to a noninverting input terminal of a comparator 72.

A threshold value Vref2 is supplied from an addition circuit 74 to an inverting input terminal of the comparator 72. The comparator 72 compares the RF signal with the threshold value Vref2 so as to make the RF signal binary. This binary signal is supplied to a band-pass filter/amplifier (BPF/AMP) 75 and to a PLL (Phase Locked Loop) /detector 76.

Figure 1:
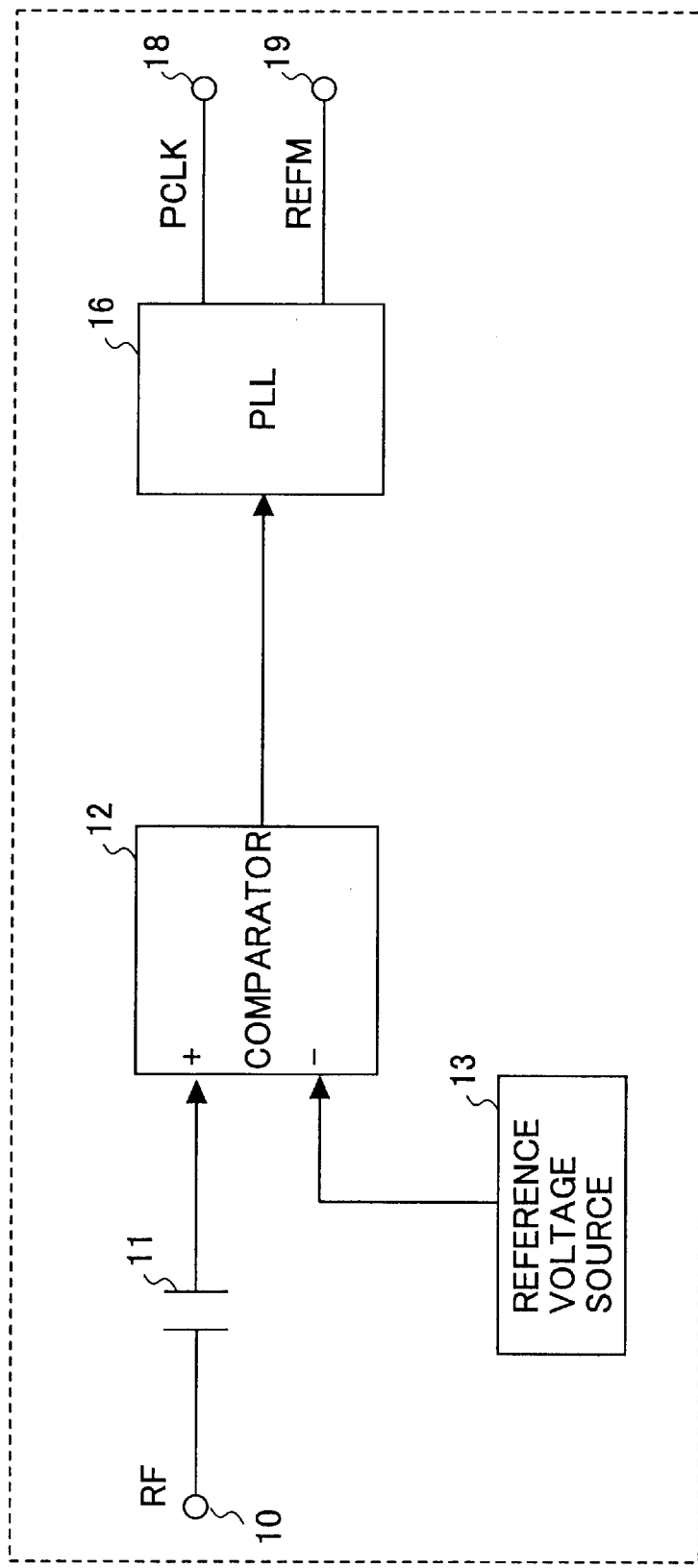
FIG. 1 is a block diagram of an example of a signal reproduction circuit of a conventional optical disk device.
Figure 2:
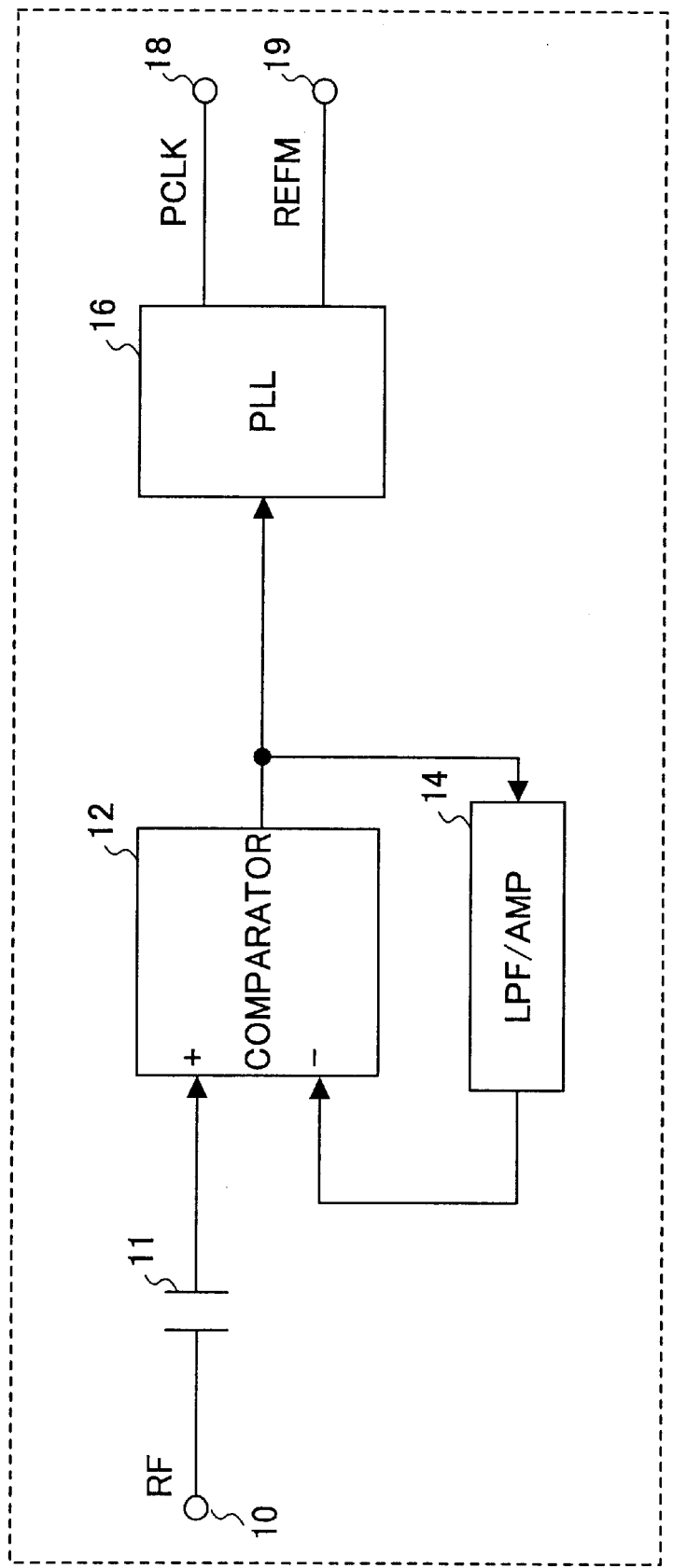
FIG. 2 is a block diagram of another example of a signal reproduction circuit of a conventional optical disk device.
Figure 3:
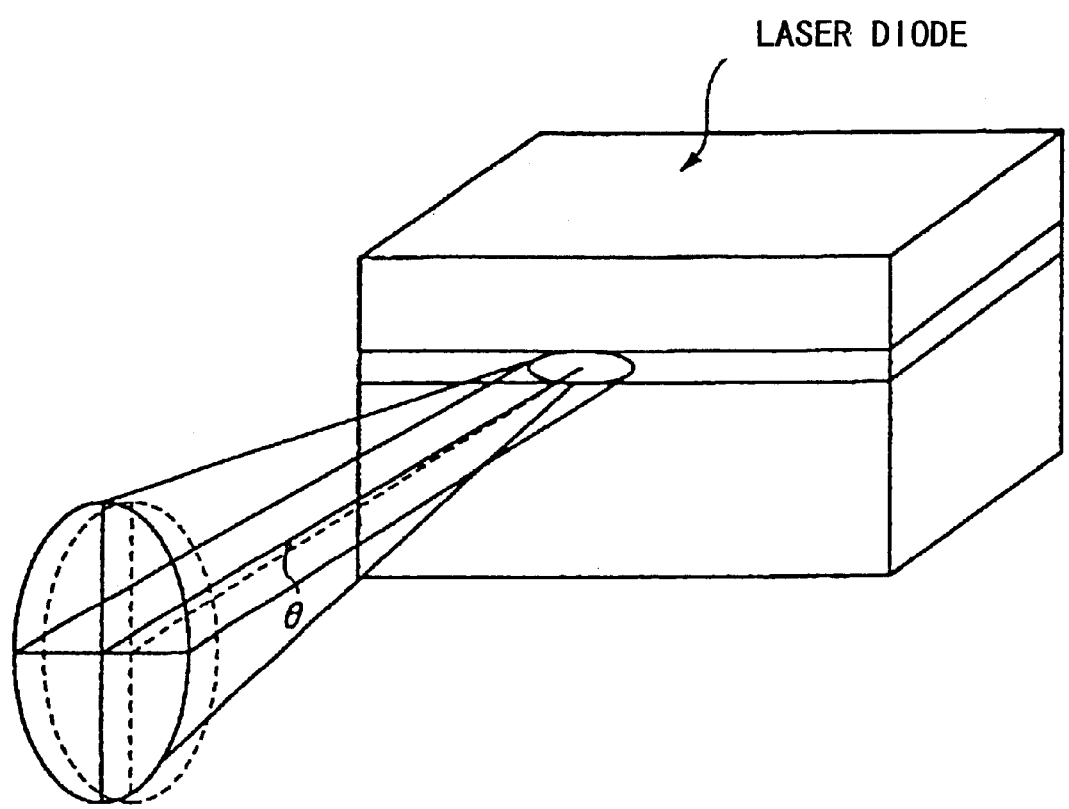
FIG. 3 is an illustration for explaining a displacement of an optical axis of a light beam projected from a laser diode.
Figure 4:
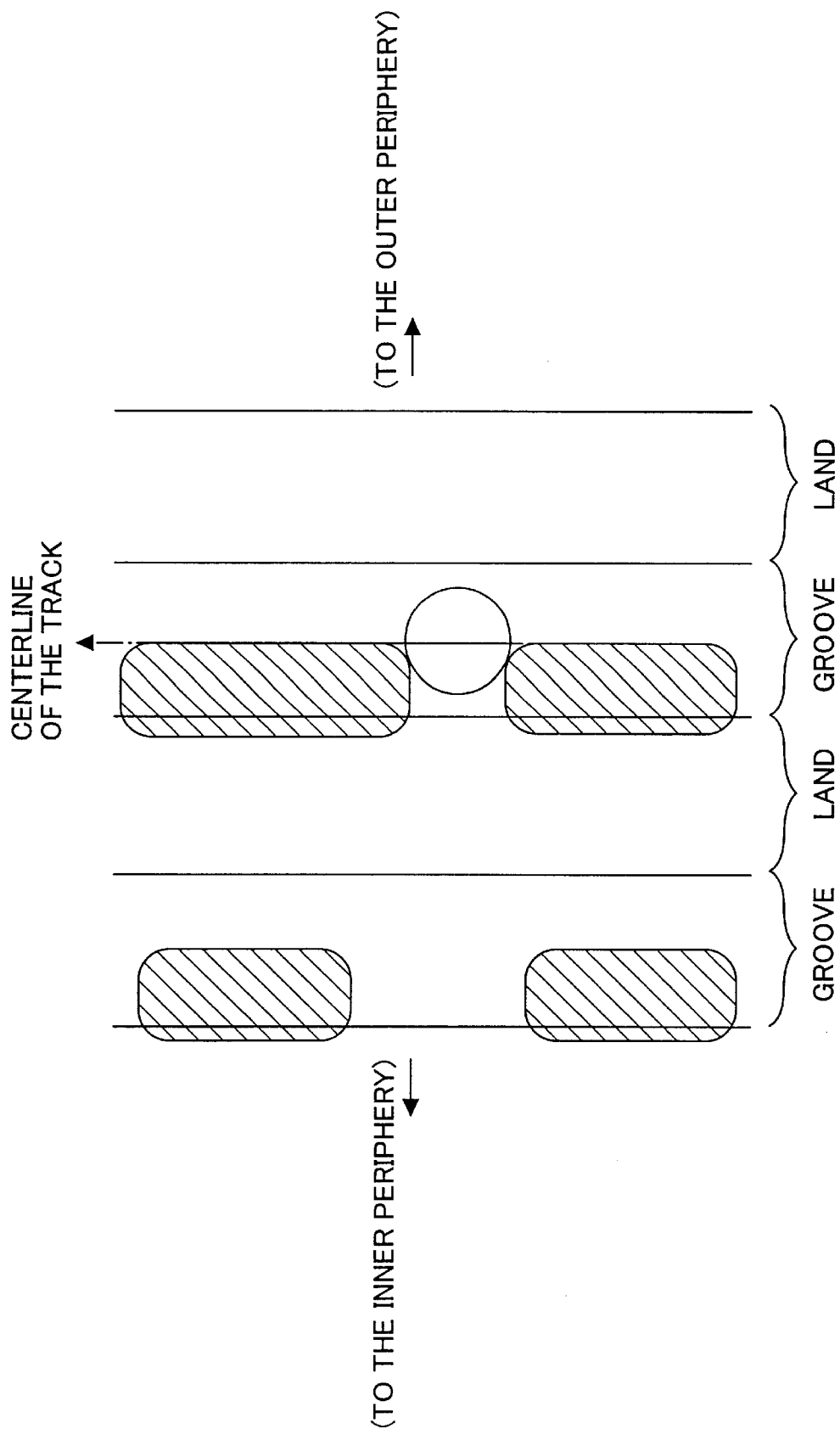
FIG. 4 is an illustration showing pits recorded by being displaced from the centerline of a track.
Figure 5:
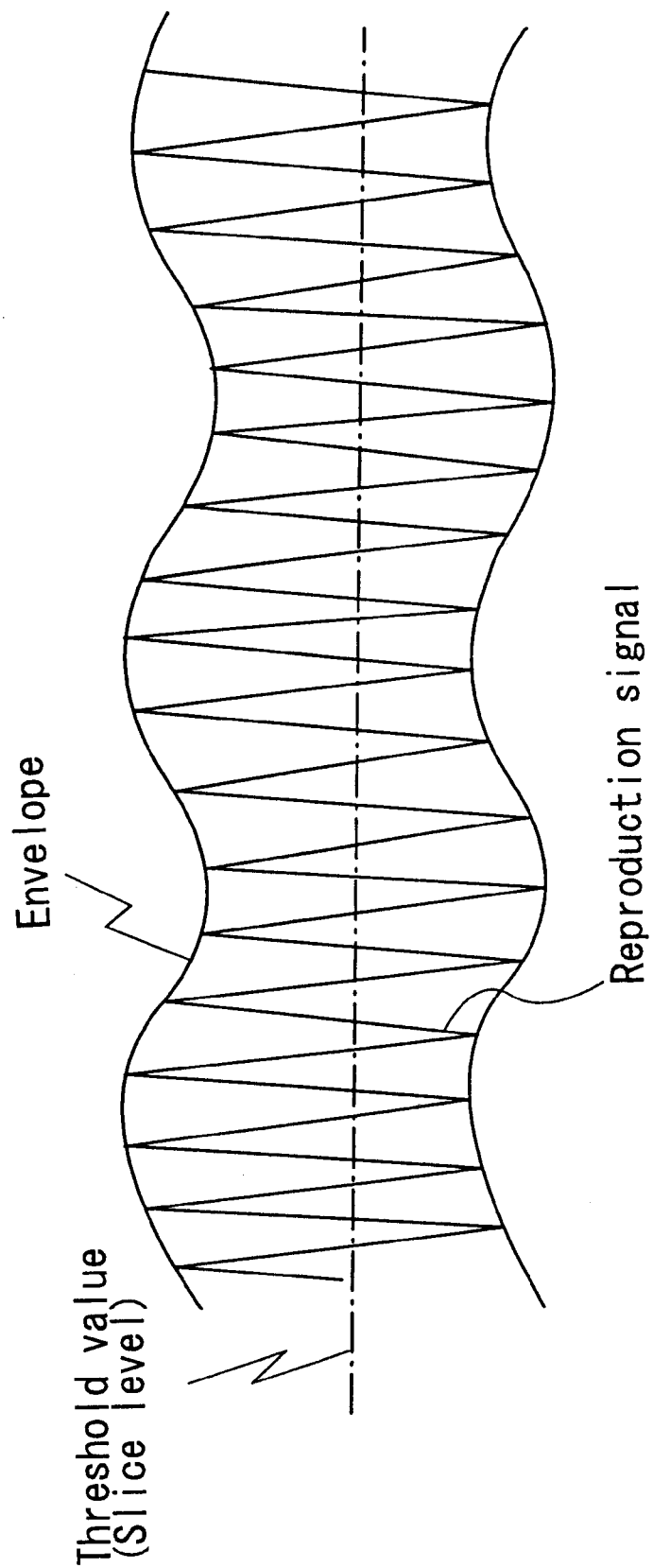
FIG. 5 is a waveform diagram of a reproduction RF signal having a wobble signal component superimposed thereon in a conventional optical disk device.
Figure 8:
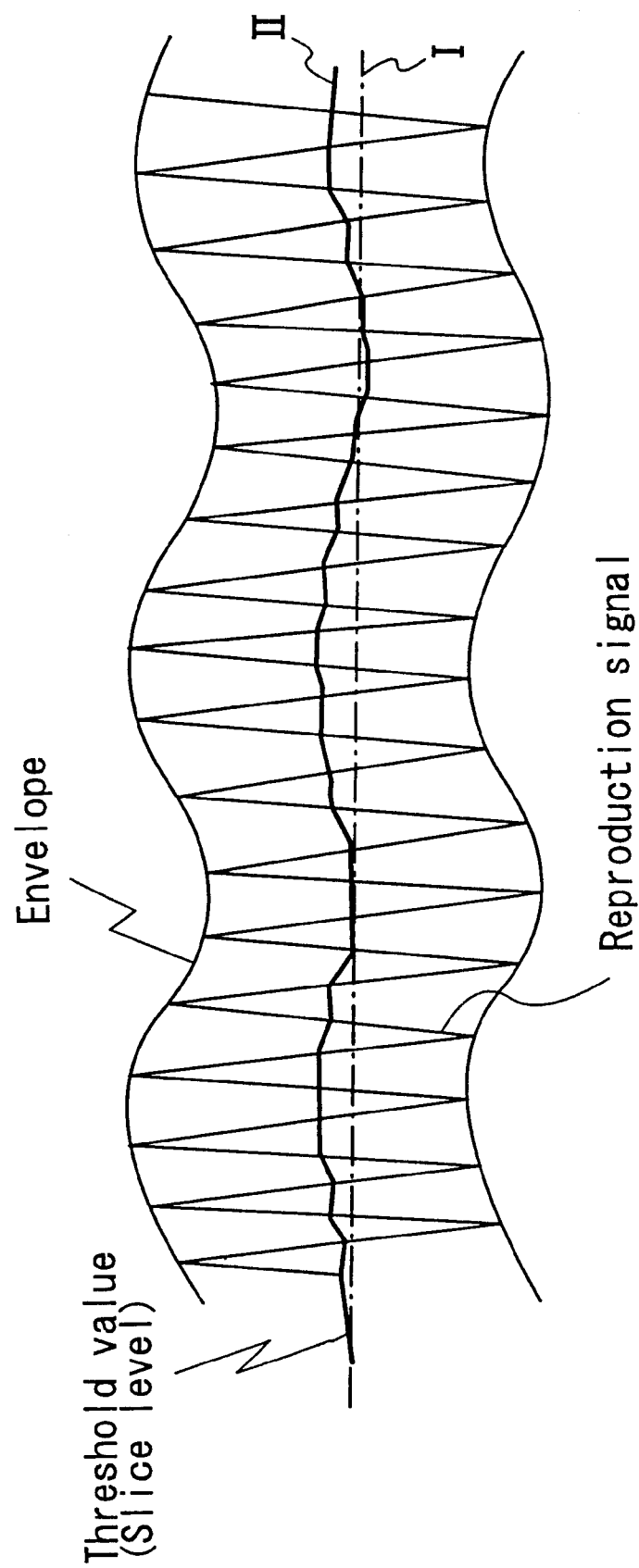
FIG. 8 is a waveform diagram of a reproduction RF signal having a wobble signal component superimposed thereon in the optical disk device according to the present invention.
Figure 9:
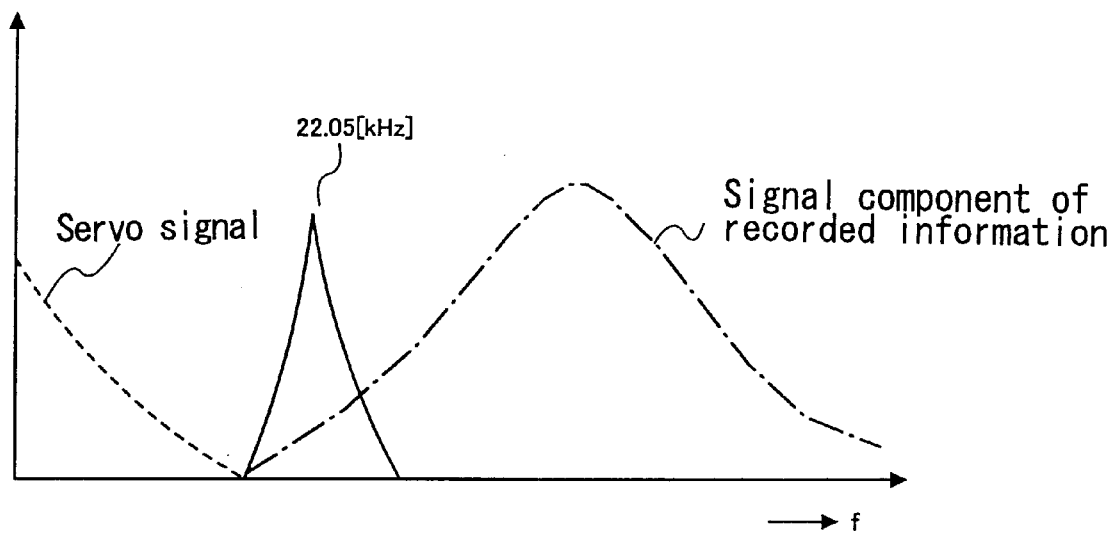
FIG. 9 shows a frequency spectrum of the reproduction RF signal.

In this course, in a case where pits are recorded by being displaced from the centerline of a track on the optical disk 32 in a manner as shown in FIG. 4, and when recorded information is reproduced from the optical disk 32, a wobble signal component is superimposed on the reproduction RF signal such that an envelope of the RF signal fluctuates up and down, as shown in FIG. 8. FIG. 9 shows a frequency spectrum of the RF signal in this case. In FIG. 9, the wobble signal component having a center frequency of 22.05 kHz indicated by a solid line is superimposed on a low-frequency band at which a signal component of the recorded information indicated by a single-dashed chain line (mostly at frequencies between 100 kHz and 1 MHz) reduces.

The band-pass filter/amplifier 75 extracts and amplifies the above-mentioned wobble signal component having the center frequency of 22.05 kHz from the binary signal, and supplies the wobble signal component to the addition circuit 74. A fixed reference value Vref1 (indicated by a single-dashed chain line I in FIG. 8) corresponding to a midpoint potential of the RF signal is supplied from a reference voltage source 73 to the addition circuit 74. A value obtained by adding the wobble signal component to the fixed reference value Vref1 is supplied to the inverting input terminal of the comparator 72 as the new threshold value Vref2 (indicated by a solid line II in FIG. 8). Thereby, the wobble signal component superimposed on the RF signal and the wobble signal component of the threshold value Vref2 are offset so as to reduce the generation of a reproduction jitter in the comparator 72.

The PLL/detector 76 generates, in a PLL thereof, a clock PCLK synchronized with the binary signal supplied from the comparator 72, and outputs the clock PCLK via a terminal 78. Also, the PLL/detector 76 detects, in a detector thereof, the presence of a reproduction pulse by a detecting window determined based on the clock PCLK so as to discriminately reproduce a signal REFM. This signal REFM is output via a terminal 79.

Figure 10:
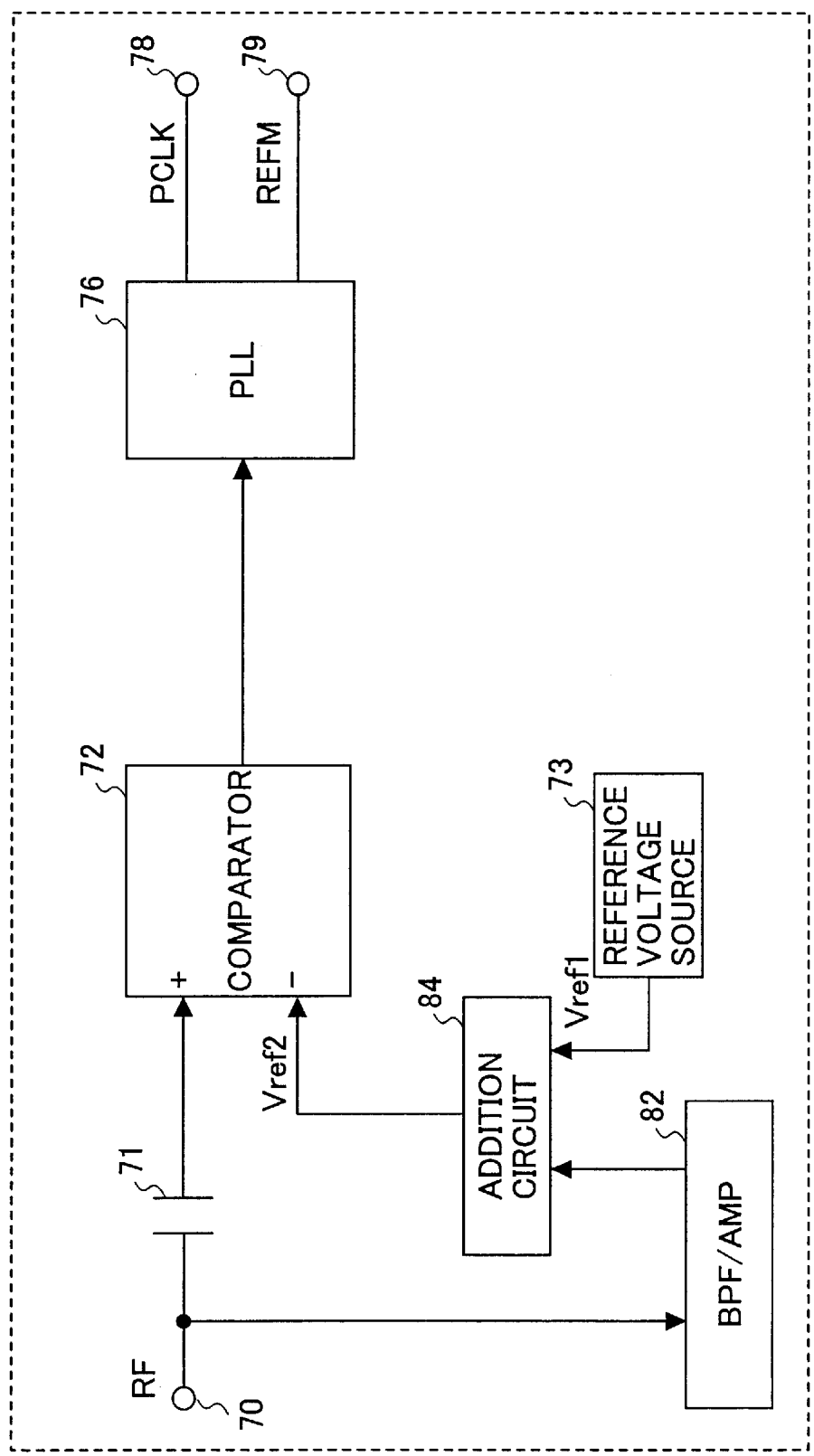
FIG. 10 is a block diagram of main parts of a signal reproduction circuit according to a second embodiment of the present invention.

FIG. 10 is a block diagram of main parts of the signal reproduction circuit 46 according to a second embodiment of the present invention. Elements in FIG. 10 that are identical to the elements shown in FIG. 7 are referenced by the same reference marks. In FIG. 10, the terminal 70 is supplied with the reproduction RF signal (obtained by adding the photoelectric conversion signals of the light-receiving surface divided in two). The direct-current components of the reproduction RF signal are removed in the capacitor 71 functioning as a high-pass filter, and the reproduction RF signal is supplied to the noninverting input terminal of the comparator 72. The reproduction RF supplied to the terminal 70 is also supplied to a band-pass filter/amplifier (BPF/AMP) 82.

The threshold value Vref2 is supplied from an addition circuit 84 to the inverting input terminal of the comparator 72. The comparator 72 compares the RF signal with the threshold value Vref2 so as to make the RF signal binary. This binary signal is supplied to the PLL/detector 76.

In this course, in the case where the pits are recorded by being displaced from the centerline of the track on the optical disk 32 in a manner as shown in FIG. 4, and when the recorded information is reproduced from the optical disk 32, the wobble signal component is superimposed on the reproduction RF signal such that the envelope of the RF signal fluctuates up and down, as shown in FIG. 8. FIG. 9 shows the frequency spectrum of the RF signal in this case. In FIG. 9, the wobble signal component having the center frequency of 22.05 kHz indicated by the solid line is superimposed on the low-frequency band at which the signal component of the recorded information indicated by the single-dashed chain line (mostly at frequencies between 100 kHz and 1 MHz) reduces.

The band-pass filter/amplifier 82 extracts and amplifies the above-mentioned wobble signal component having the center frequency of 22.05 kHz from the RF signal, and supplies the wobble signal component to the addition circuit 84. The fixed reference value Vref1 (indicated by the single-dashed chain line I in FIG. 8) corresponding to the midpoint potential of the RF signal is supplied from the reference voltage source 73 to the addition circuit 84. The value obtained by adding the wobble signal component to the fixed reference value Vref1 is supplied to the inverting input terminal of the comparator 72 as the new threshold value Vref2 (indicated by the solid line II in FIG. 8).

The comparator 72 compares the RF signal with the threshold value Vref2 so as to make the RF signal binary. Thereby, the wobble signal component superimposed on the RF signal and the wobble signal component of the threshold value Vref2 are offset so as to reduce the generation of a reproduction jitter in the comparator 72.

The PLL/detector 76 generates, in the PLL thereof, the clock PCLK synchronized with the binary signal supplied from the comparator 72, and outputs the clock PCLK via the terminal 78. Also, the PLL/detector 76 detects, in the detector thereof, the presence of a reproduction pulse by the detecting window determined based on the clock PCLK so as to discriminately reproduce the signal REFM. This signal REFM is output via the terminal 79.

Figure 11:
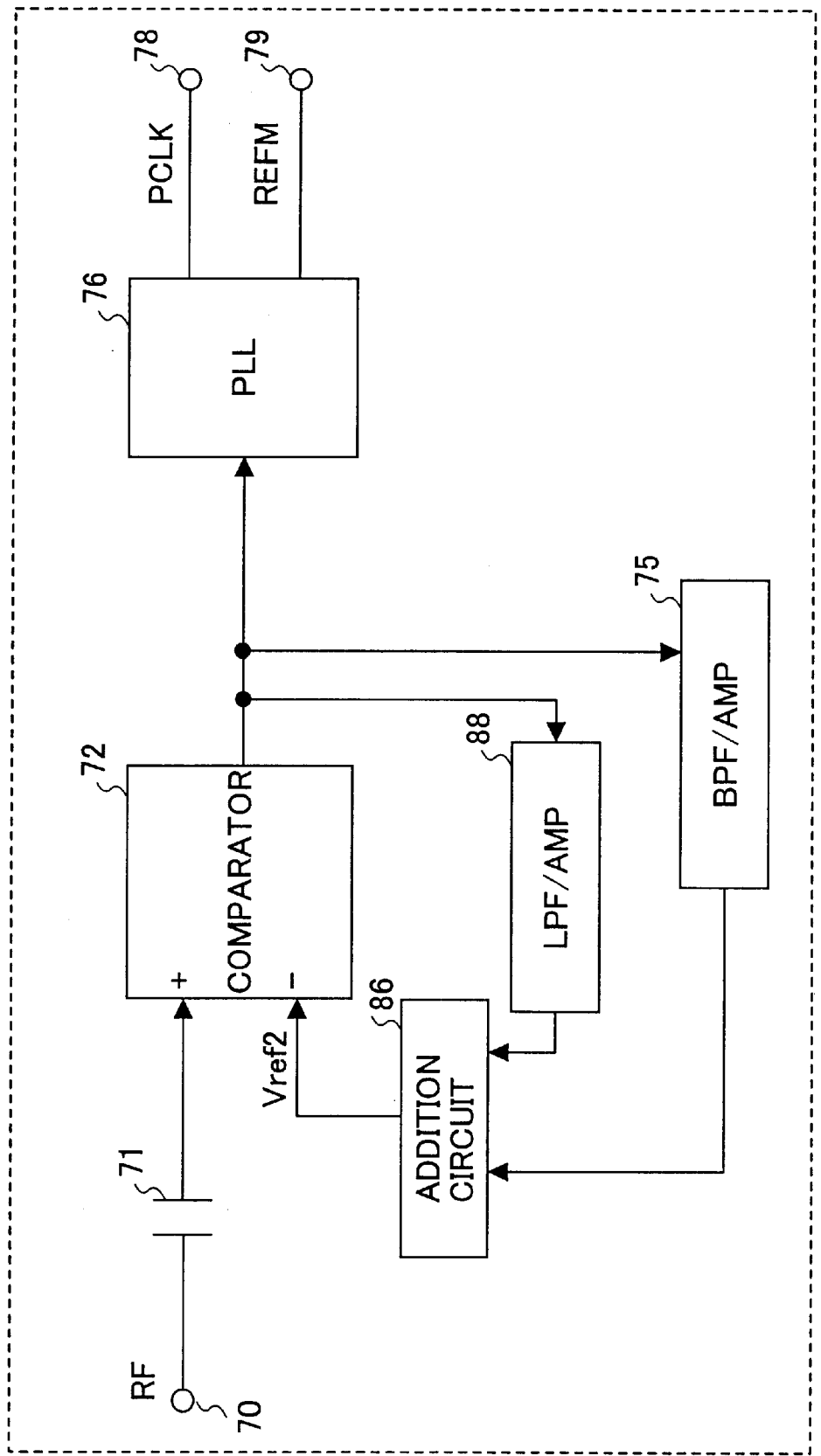
FIG. 11 is a block diagram of main parts of a signal reproduction circuit according to a third embodiment of the present invention.

FIG. 11 is a block diagram of main parts of the signal reproduction circuit 46 according to a third embodiment of the present invention. Elements in FIG. 11 that are identical to the elements shown in FIG. 7 are referenced by the same reference marks. In FIG. 11, the terminal 70 is supplied with the reproduction RF signal (obtained by adding the photoelectric conversion signals of the light-receiving surface divided in two). The direct-current components of the reproduction RF signal are removed in the capacitor 71 functioning as a high-pass filter, and the reproduction RF signal is supplied to the noninverting input terminal of the comparator 72.

The threshold value Vref2 is supplied from an addition circuit 86 to the inverting input terminal of the comparator 72. The comparator 72 compares the RF signal with the threshold value Vref2 so as to make the RF signal binary. This binary signal is supplied to the band-pass filter/amplifier (BPF/AMP) 75, a low-pass filter/amplifier (LPF/AMP) 88, and the PLL/detector 76.

In this course, in the case where the pits are recorded by being displaced from the centerline of the track on the optical disk 32 in a manner as shown in FIG. 4, and when the recorded information is reproduced from the optical disk 32, the wobble signal component is superimposed on the reproduction RF signal such that the envelope of the RF signal fluctuates up and down, as shown in FIG. 8. FIG. 9 shows the frequency spectrum of the RF signal in this case. In FIG. 9, the wobble signal component having the center frequency of 22.05 kHz indicated by the solid line is superimposed on the low-frequency band at which the signal component of the recorded information indicated by the single-dashed chain line (mostly at frequencies between 100 kHz and 1 MHz) reduces.

The band-pass filter/amplifier 75 extracts and amplifies the above-mentioned wobble signal component having the center frequency of 22.05 kHz from the binary signal, and supplies the wobble signal component to the addition circuit 86. The low-pass filter/amplifier 88 integrates the binary signal, and thereafter, amplifies the integrated value with a predetermined gain so as to generate a threshold value (an integrated reference value) corresponding to the midpoint potential of the RF signal. Then, the low-pass filter/amplifier 88 supplies the threshold value (the integrated reference value) to the addition circuit 86.

The comparator 72 and the low-pass filter/amplifier 88 form an asymmetry correction circuit, which determines the threshold value such that high-level periods and low-level periods of the binary signal become equal in total. A response characteristic of this asymmetry correction circuit is optimized by adjusting a time constant and a gain of the low-pass filter/amplifier 88, an amplitude of the RF signal, and an output voltage of the comparator 72. A cutoff frequency of the low-pass filter/amplifier 88 is set at approximately 500 Hz, for example, so as not to interfere with an EFM frequency component as indicated by a broken line in FIG. 9.

The addition circuit 86 adds the wobble signal component to the threshold value corresponding to the midpoint potential of the RF signal, and supplies the obtained value to the inverting input terminal of the comparator 72 as the new threshold value Vref2 (indicated by the solid line II in FIG. 8). Thereby, the wobble signal component superimposed on the RF signal and the wobble signal component of the threshold value Vref2 are offset so as to reduce the generation of a reproduction jitter in the comparator 72.

Figure 12:
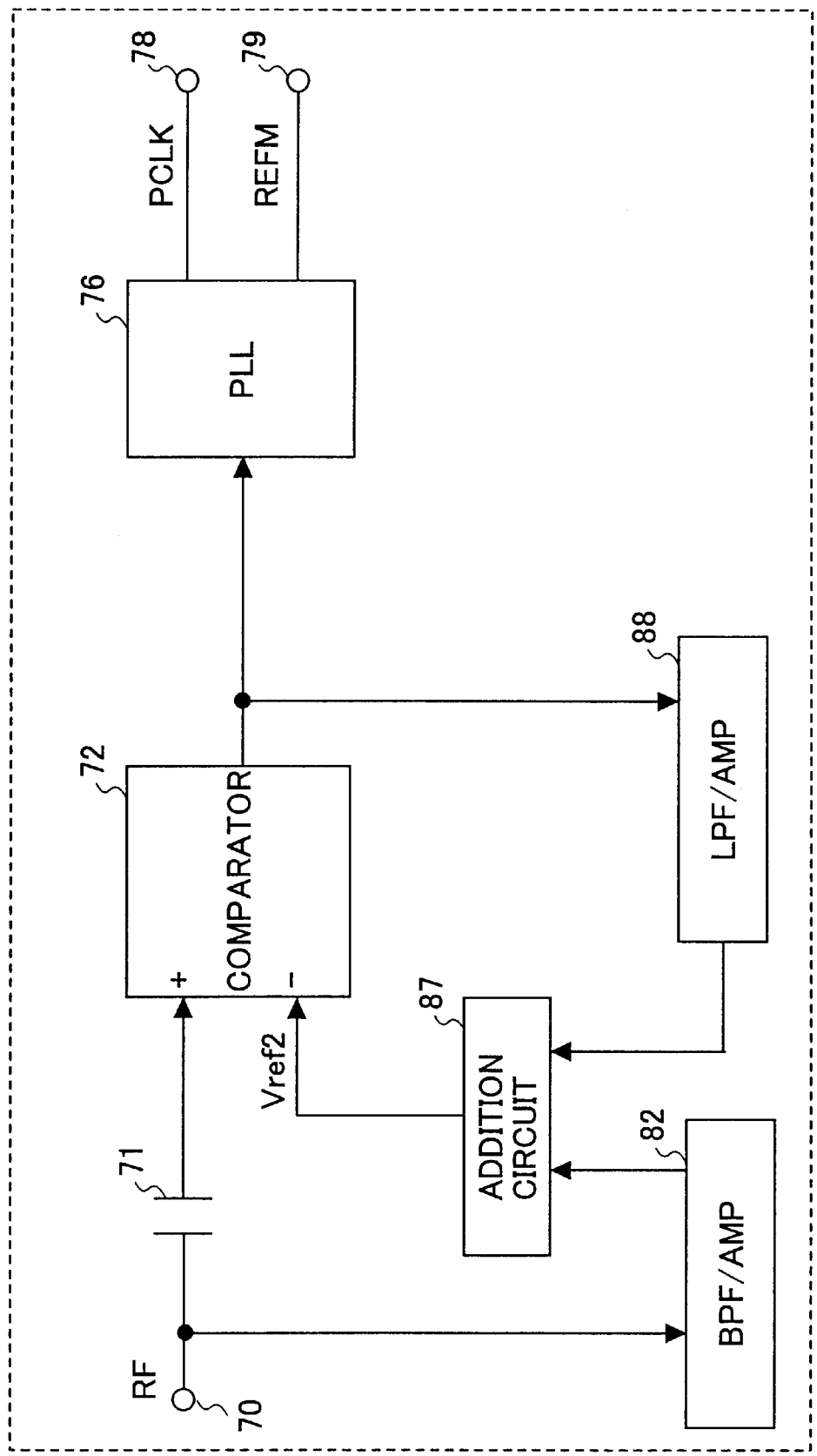
FIG. 12 is a block diagram of main parts of a signal reproduction circuit according to a fourth embodiment of the present invention.

FIG. 12 is a block diagram of main parts of the signal reproduction circuit 46 according to a fourth embodiment of the present invention. Elements in FIG. 12 that are identical to the elements shown in FIG. 7, FIG. 10 and FIG. 11 are referenced by the same reference marks. In FIG. 12, the terminal 70 is supplied with the reproduction RF signal (obtained by adding the photoelectric conversion signals of the light-receiving surface divided in two). The direct-current components of the reproduction RF signal are removed in the capacitor 71 functioning as a high-pass filter, and the reproduction RF signal is supplied to the noninverting input terminal of the comparator 72. The reproduction RF supplied to the terminal 70 is also supplied to the band-pass filter/amplifier (BPF/AMP) 82.

The threshold value Vref2 is supplied from an addition circuit 87 to the inverting input terminal of the comparator 72. The comparator 72 compares the RF signal with the threshold value Vref2 so as to make the RF signal binary. This binary signal is supplied to the low-pass filter/amplifier (LPF/AMP) 88 and the PLL/detector 76.

In this course, in the case where the pits are recorded by being displaced from the centerline of the track on the optical disk 32 in a manner as shown in FIG. 4, and when the recorded information is reproduced from the optical disk 32, the wobble signal component is superimposed on the reproduction RF signal such that the envelope of the RF signal fluctuates up and down, as shown in FIG. 8. FIG. 9 shows the frequency spectrum of the RF signal in this case. In FIG. 9, the wobble signal component having the center frequency of 22.05 kHz indicated by the solid line is superimposed on the low-frequency band at which the signal component of the recorded information indicated by the single-dashed chain line (mostly at frequencies between 100 kHz and 1 MHz) reduces. The band-pass filter/amplifier 82 extracts and amplifies the above-mentioned wobble signal component having the center frequency of 22.05 kHz from the RF signal, and supplies the wobble signal component to the addition circuit 87.

The low-pass filter/amplifier 88 integrates the binary signal, and thereafter, amplifies the integrated value with a predetermined gain so as to generate a threshold value corresponding to the midpoint potential of the RF signal. Then, the low-pass filter/amplifier 88 supplies the threshold value to the addition circuit 87.

The comparator 72 and the low-pass filter/amplifier 88 form the asymmetry correction circuit, which determines the threshold value such that high-level periods and low-level periods of the binary signal become equal in total. The response characteristic of this asymmetry correction circuit is optimized by adjusting the time constant and the gain of the low-pass filter/amplifier 88, the amplitude of the RF signal, and the output voltage of the comparator 72. The cutoff frequency of the low-pass filter/amplifier 88 is set at approximately 500 Hz, for example, so as not to interfere with the EFM frequency component as indicated by the broken line in FIG. 9.

The addition circuit 87 adds the wobble signal component to the threshold value corresponding to the midpoint potential of the RF signal, and supplies the obtained value to the inverting input terminal of the comparator 72 as the new threshold value Vref2 (indicated by the solid line II in FIG. 8). Thereby, the wobble signal component superimposed on the RF signal and the wobble signal component of the threshold value Vref2 are offset so as to reduce the generation of a reproduction jitter in the comparator 72.

The PLL/detector 76 generates, in the PLL thereof, the clock PCLK synchronized with the binary signal supplied from the comparator 72, and outputs the clock PCLK via the terminal 78. Also, the PLL/detector 76 detects, in the detector thereof, the presence of a reproduction pulse by the detecting window determined based on the clock PCLK so as to discriminately reproduce the signal REFM. This signal REFM is output via the terminal 79.

Figure 13:
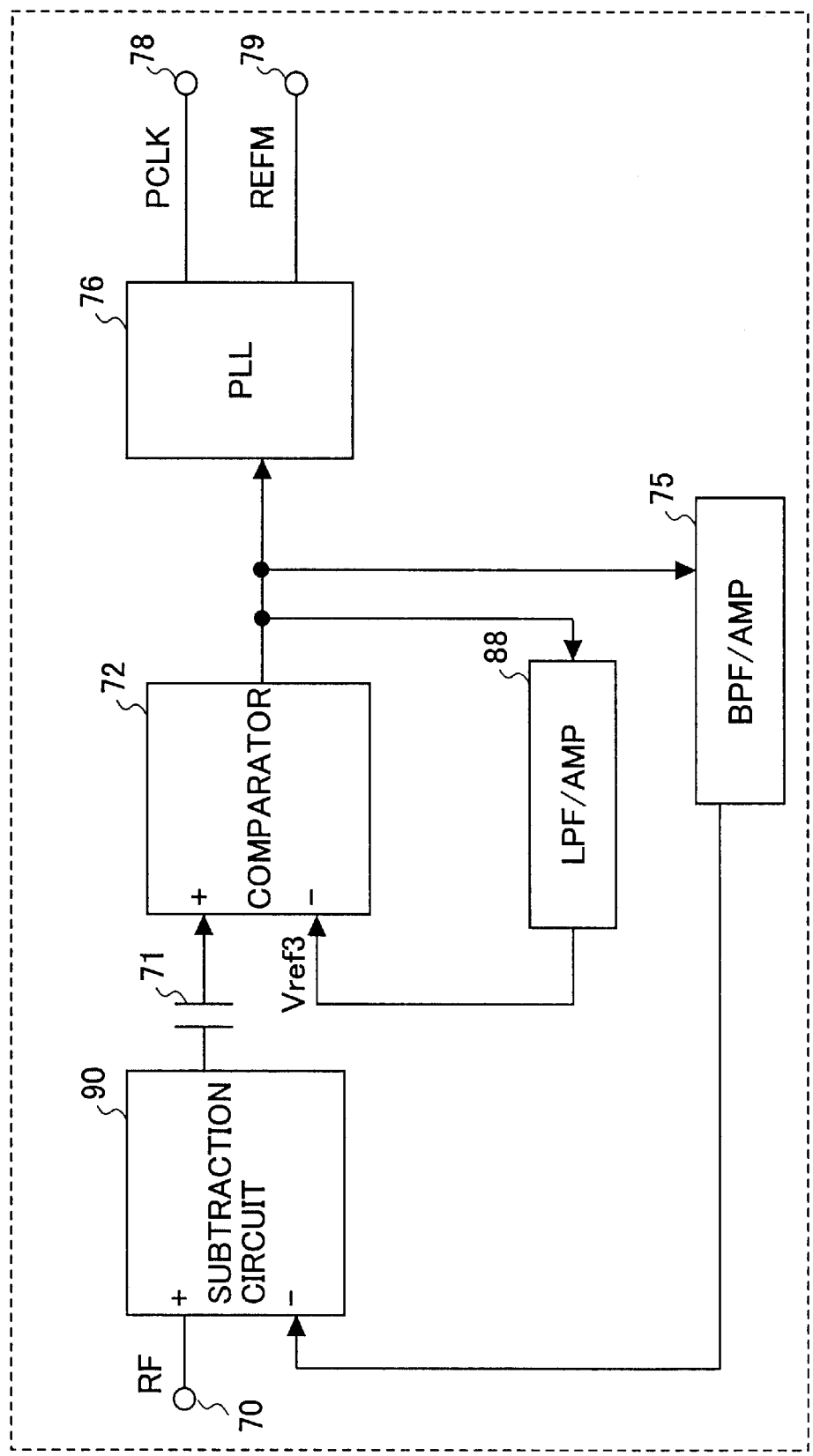
FIG. 13 is a block diagram of main parts of a signal reproduction circuit according to a fifth embodiment of the present invention.

FIG. 13 is a block diagram of main parts of the signal reproduction circuit 46 according to a fifth embodiment of the present invention. Elements in FIG. 13 that are identical to the elements shown in FIG. 11 are referenced by the same reference marks. In FIG. 13, the terminal 70 is supplied with the reproduction RF signal (obtained by adding the photoelectric conversion signals of the light-receiving surface divided in two). The reproduction RF signal is then supplied to a subtraction circuit 90. Direct-current components of an output signal of the subtraction circuit 90 are removed in the capacitor 71 functioning as a high-pass filter, and the output signal is supplied to the noninverting input terminal of the comparator 72.

A threshold value Vref3 is supplied from the low-pass filter/amplifier (LPF/AMP) 88 to the inverting input terminal of the comparator 72. The comparator 72 compares the RF signal with the threshold value Vref3 so as to make the RF signal binary. This binary signal is supplied to the band-pass filter/amplifier (BPF/AMP) 75, the low-pass filter/amplifier 88, and the PLL/detector 76. The low-pass filter/amplifier 88 integrates the binary signal, and thereafter, amplifies the integrated value with a predetermined gain so as to generate the threshold value (the integrated reference value) corresponding to the midpoint potential of the RF signal. Then, the lowpass filter/amplifier 88 supplies the threshold value (the integrated reference value) to the inverting input terminal of the comparator 72 as the threshold value Vref3.

The comparator 72 and the low-pass filter/amplifier 88 form the asymmetry correction circuit, which determines the threshold value such that high-level periods and low-level periods of the binary signal become equal in total. The response characteristic of this asymmetry correction circuit is optimized by adjusting the time constant and the gain of the low-pass filter/amplifier 88, the amplitude of the RF signal, and the output voltage of the comparator 72. The cutoff frequency of the low-pass filter/amplifier 88 is set at approximately 500 Hz, for example, so as not to interfere with the EFM frequency component as indicated by the broken line in FIG. 9.

In this course, in the case where the pits are recorded by being displaced from the centerline of the track on the optical disk 32 in a manner as shown in FIG. 4, and when the recorded information is reproduced from the optical disk 32, the wobble signal component is superimposed on the reproduction RF signal such that the envelope of the RF signal fluctuates up and down, as shown in FIG. 8. FIG. 9 shows the frequency spectrum of the RF signal in this case. In FIG. 9, the wobble signal component having the center frequency of 22.05 kHz indicated by the solid line is superimposed on the low-frequency band at which the signal component of the recorded information indicated by the single-dashed chain line (mostly at frequencies between 100 kHz and 1 MHz) reduces.

Figure 14:
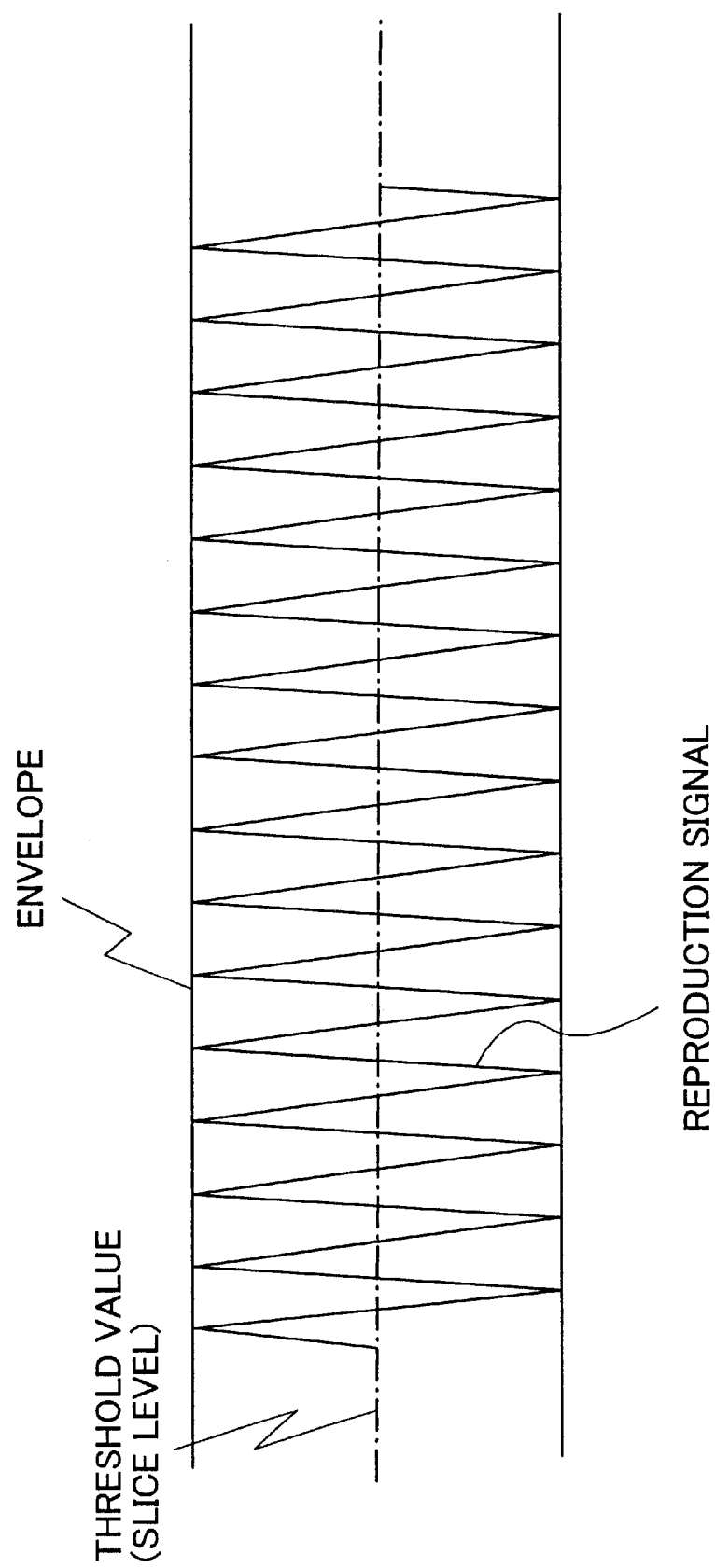
FIG. 14 is a waveform diagram of a reproduction RF signal having an envelope not fluctuating up and down in the optical disk device according to the present invention.

The band-pass filter/amplifier 75 extracts and amplifies the above-mentioned wobble signal component having the center frequency of 22.05 kHz from the binary signal, and supplies the wobble signal component to the subtraction circuit 90. The subtraction circuit 90 subtracts the wobble signal component from the RF signal including the superimposed wobble signal component. Thereby, the wobble signal component superimposed on the RF signal is removed so that the envelope of the RF signal does not fluctuate up and down, as shown in FIG. 14. Therefore, the generation of a reproduction jitter in the comparator 72 can be reduced.

Besides, although the heretofore-described embodiments involve the recording and reproducing optical disk device, the present invention is not limited to those embodiments, and may also be applied to a device only reproducing information from an optical disk on which the information is recorded by another recording and reproducing optical disk device. Additionally, although the above-described embodiments use the capacitor 71 to remove the direct-current components of the reproduction RF signal, a high-pass filter may be used in place of the capacitor 71. Further, although a circuit structure including an asymmetry correction circuit does not require the capacitor 71 in principle, the capacitor 71 cuts off most of low-frequency components beforehand so as to reduce the amount of erroneously remaining direct-current components in the reproduction RF signal after the asymmetry correction circuit.

It is noted that the comparator 72 corresponds to a comparing means (a comparator), the band-pass filter/amplifier 75 corresponds to a first band-pass filtering means (a first band-pass filter), the band-pass filter/amplifier 82 corresponds to a second band-pass filtering means (a second band-pass filter), the addition circuit 74 corresponds to a first adding means (a first adder), the addition circuit 84 corresponds to a second adding means (a second adder), the low-pass filter/amplifier 88 corresponds to an integrating means (an integrator), the addition circuit 86 corresponds to a third adding means (a third adder), the addition circuit 87 corresponds to a fourth adding means (a fourth adder), and the subtraction circuit 90 corresponds to a subtracting means (a subtracter).

The present invention is not limited to the specifically disclosed embodiments, and variations and modifications may be made without departing from the scope of the present invention.

The present application is based on Japanese priority application No. 2000-370071 filed on Dec. 5, 2000, the entire contents of which are hereby incorporated by reference.

What is claimed is:

1. An optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing said RF signal with a threshold value so as to output a binary signal;

a first band-pass filter filtering a frequency band of said wobble signal from said binary signal so as to extract a wobble signal component; and a first adder obtaining a value by adding said wobble signal component to a fixed reference value so as to supply said value to said comparator as said threshold value.

2. An optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing said RF signal with a threshold value so as to output a binary signal;

a second band-pass filter filtering a frequency band of said wobble signal from said RF signal so as to extract a wobble signal component; and a second adder obtaining a value by adding said wobble signal component to a fixed reference value so as to supply said value to said comparator as said threshold value.

3. An optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing said RF signal with a threshold value so as to output a binary signal;

a first band-pass filter filtering a frequency band of said wobble signal from said binary signal so as to extract a wobble signal component;

an integrator integrating said binary signal so as to generate an integrated reference value; and a third adder obtaining a value by adding said wobble signal component to said integrated reference value so as to supply said value to said comparator as said threshold value.

4. An optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing said RF signal with a threshold value so as to output a binary signal;

a second band-pass filter filtering a frequency band of said wobble signal from said RF signal so as to extract a wobble signal component;

an integrator integrating said binary signal so as to generate an integrated reference value; and a fourth adder obtaining a value by adding said wobble signal component to said integrated reference value so as to supply said value to said comparator as said threshold value.

5. An optical disk device reproducing an RF signal by projecting a light beam on an optical disk and detecting a reflected light therefrom, information being recorded on the optical disk by forming a pit on a track determined according to a groove having a wobble signal recorded thereon, the device comprising:

a comparator comparing said RF signal with a threshold value so as to output a binary signal;

a first band-pass filter filtering a frequency band of said wobble signal from said binary signal so as to extract a wobble signal component;

an integrator integrating said binary signal so as to generate an integrated reference value and supply said integrated reference value to said comparator as said threshold value; and a subtracter subtracting said wobble signal component from said RF signal so as to supply said RF signal to said comparator.

\* \* \* \* \*